(12) United States Patent
Campbell

(10) Patent No.: US 10,031,396 B2
(45) Date of Patent: Jul. 24, 2018

(54) TUNABLE POLYMER DISPERSED LIQUID CRYSTAL LENS DOUBLET

(71) Applicant: GoPro, Inc., San Mateo, CA (US)

(72) Inventor: Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/603,381

(22) Filed: May 23, 2017

(65) Prior Publication Data

US 2018/0143504 A1 May 24, 2018

Related U.S. Application Data

(60) Provisional application No. 62/425,048, filed on Nov. 21, 2016.

(51) Int. Cl.
*G02F 1/29* (2006.01)
*H04N 5/225* (2006.01)

(52) U.S. Cl.
CPC .............. *G02F 1/29* (2013.01); *H04N 5/2253* (2013.01); *H04N 5/2254* (2013.01); *G02F 2201/12* (2013.01); *G02F 2201/16* (2013.01)

(58) Field of Classification Search
CPC .... G02B 27/2214; G02F 1/29; G02F 1/12955
See application file for complete search history.

(56) References Cited

U.S. PATENT DOCUMENTS

| 6,271,899 B1 | 8/2001 | Lewis et al. |
| 6,545,739 B1 | 4/2003 | Matsumoto et al. |
| 2015/0160467 A1* | 6/2015 | Kim ................ G02B 27/26 349/15 |

\* cited by examiner

*Primary Examiner* — Phu Vu
(74) *Attorney, Agent, or Firm* — Young Basile Hanlon & MacFarlane, P.C.

(57) ABSTRACT

A camera system includes an image sensor assembly and a tunable optical element. The tunable optical element is a polymer dispersed liquid crystal lens doublet using a PDLC layer. The doublet is tunable by applying an electric field to the optical element via a control element. The control element applies a voltage differential to the optical element inducing an electric field which changes the polarization of the PDLC within the optical element. The refractive index of the lens doublet is dependent on the polarization of the liquid crystals within the optical element. Applying the electric field to the tunable element changes the optical properties of the lens doublet.

20 Claims, 11 Drawing Sheets

$n_o, \theta = 0°, \vec{E} = E_a$ $n_e, \theta \neq 0°, \vec{E} = E_b$

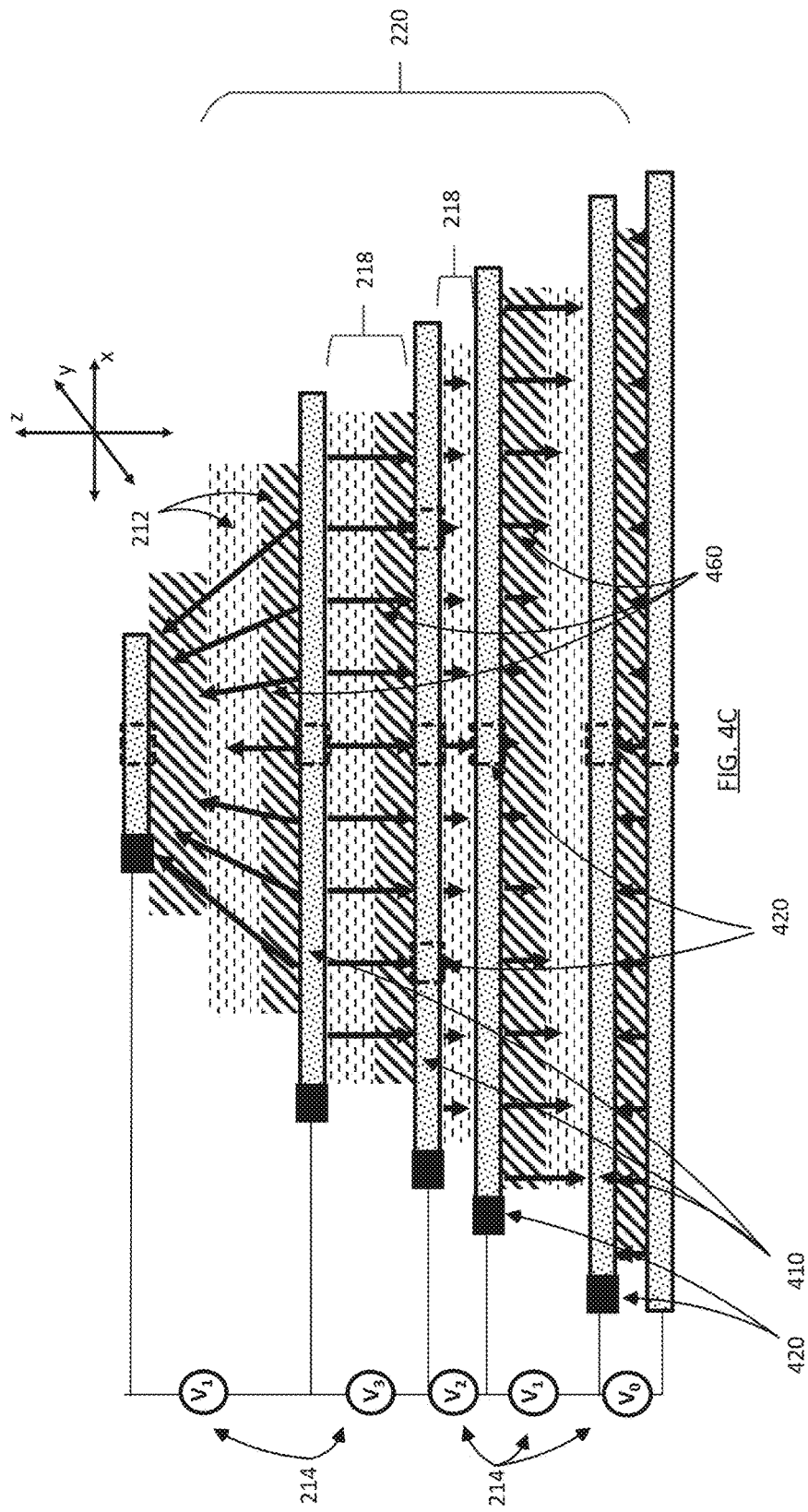

US 10,031,396 B2

TUNABLE POLYMER DISPERSED LIQUID CRYSTAL LENS DOUBLET

CROSS REFERENCE TO RELATED APPLICATIONS

This application claims the benefit of U.S. Provisional Application No. 62/425,048, filed Nov. 21, 2016, which is incorporated by reference in its entirety.

BACKGROUND

Field of Art

This description generally relates to camera systems and more specifically, to camera systems including a tunable lens systems.

Description of Related Art

Digital cameras are becoming more pervasive in the field of activity focused photography. As their popularity increases, the cameras are being miniaturized to even higher degrees. As the cameras are miniaturized the functionality of the optical systems can diminish as various optical elements are sacrificed in order to reduce optical system footprints. Current activity cameras are designed with optical systems that produce the highest quality images with the smallest optical footprint, but still can be greatly improved in terms of functionality.

Some examples of functionality that current activity camera optical systems have sacrificed to minimize the camera size include: diffraction control, prism effects, aberration minimization, focal control, etc. A camera system using tunable optical elements that increases the functionality of activity cameras without increasing their optical system footprint is desired.

BRIEF DESCRIPTION OF DRAWINGS

FIG. 4C shows a stack of circular sheet resistor annuli from the side with variable inner and outer radii, according to one example embodiment.

DETAILED DESCRIPTION

Figure 1A:
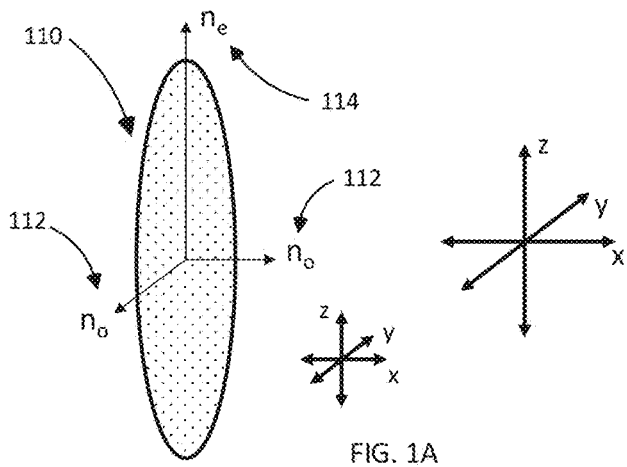
FIG. 1A shows a liquid crystal with a first refractive index $n_O$ in the x and y direction and a second refractive index in the z direction, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera system includes an image sensor assembly for capturing images and is centered about an optical axis. The camera system includes a tunable optical element for focusing light onto the image sensor. The tunable optical element is substantially cylindrical with at least a bottom side and a top side centered about the optical axis. The tunable optical element includes a first layer of a first material having a first refractive index associated with the first material. The tunable optical element also includes a second layer of a second material having a refractive index. The second material also has a polarization that is controllable by an applied electric field and the polarization of the second material controls the refractive index of the second material.

The first and second layer are layered as a layer stack in the tunable optical element. The second layer has an arc shaped cross section forming a spherical cap having its respective peak aligned with optical axis. The first layer has a second arc-shaped cross section forming a reciprocal shape to the spherical cap in the layer stack.

The tunable optical element includes a first control element. The first control element is coupled to the tunable optical element and applies a voltage differential to the first and second layers. The applied voltage differential creates an electric field controlling the refractive index of the second layer, and, thus, the refractive index of the second layer. In other configurations, more than one control element is coupled to the first and second layer and control the refractive index.

In some configurations, the second material is a tunable polymer dispersed liquid crystal. The second material can be controllable between a first state and a second state, the first state configuring the tunable element to transmit light and the second state configured to alter the transmitted light. The camera system can be configured to toggle the second material from the first state to the second state using the applied electric field. Toggling the material from the first state to the second state can change the polarization of the second material from a first value to a second value.

In some configurations, the first control element is a pair of electrodes coupled to opposing surfaces of the tunable optical element. In this configuration, the voltage differential is created by applying a first voltage to a first electrode of the pair and a second voltage to the second electrode of the pair.

In some configurations, applying the electric field changes the focal length of the tunable optical element while in other configurations applying the electric field affects the optical aberration of the camera system.

In some configurations, the camera system also includes a lens tube containing optical elements including the tunable optical element.

Tunable Polymer Dispersed Liquid Crystals

Polymer Dispersed Liquid Crystals

In polymer dispersed liquid crystal devices (PDLCs), liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the PDLC. Typically, the liquid mix of polymer and liquid crystals is placed between two layers of glass or plastic that include a thin layer of a transparent, conductive material followed by curing of the polymer, thereby forming the basic sandwich structure of a tunable optical element.

Electrodes from a power supply are attached to transparent electrodes coupled to the PDLCs. With no applied voltage, the liquid crystals are randomly arranged in the droplets, resulting in a first refractive index as it passes through the assembly. When a voltage is applied to the electrodes, the electric field formed between the two transparent electrodes on the glass causes the liquid crystals to align, allowing light to pass through the droplets with a different refractive index and resulting in different optical properties of the assembly. The refractive index (or indexes) can be controlled by the applied voltage. This is possible because at lower voltages, only a few of the liquid crystals align completely in the electric field, so only a small portion of the light passes through a first refractive index while most of the light passes through a second refractive index. As the voltage is increased, fewer liquid crystals remain out of alignment, resulting in additional light passing through the second refractive index. More generally, the applied electric field can control the refractive index in any number of ways as described herein. It is also possible to control the amount of light passing through, when tints and dissimilar inner layers are used.

PDLC Refractive Indices

Liquid crystals are a material which can have properties of conventional liquids and solid crystals. For example, a liquid crystal may flow like a liquid but its molecules may be oriented in crystal like configurations. PLDCs can have optical properties that vary depending on the properties of the light, liquid crystals, and polymers in the system. The optical properties of PDLCs can be influenced by: the shape, orientation, composition, and size of the liquid crystal; the polarization, incident angle, and wavelength of the interacting light; shape, composition, size, and thickness of the polymer; any other material property of elements of the system; or any other optical property of elements of the system.

FIG. 1A shows a liquid crystal 110 with a first refractive index $n_0$ 112 in the x and y directions and a second refractive index $n_e$ 114 in the z direction. The illustrated liquid crystal 110 can be substantially ovoid in shape and is symmetric about the z axis, but liquid crystals can take any shape. The shape, composition, size, and orientation of a liquid crystal can all affect the optical characteristics of the liquid crystal. Further, the liquid crystal is responsive to electric fields, charges, and currents and the electrical activity can reorient the direction of the crystal based on the strength, proximity, and direction of the electrical activity. Generally, the liquid crystals are dispersed in a polymer substrate such that the liquid crystals are substantially colloidal within the polymer substrate.

Figure 1B:
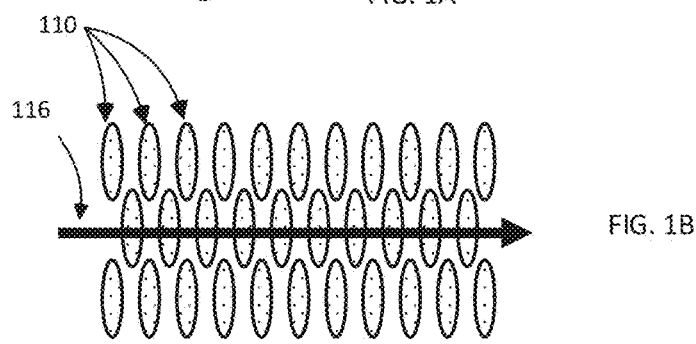
FIG. 1B shows an array of liquid crystals dispersed in a polymer that are substantially well aligned in the z-direction when exposed to the electric field $E_a$, according to one example embodiment.

FIG. 1B shows an array of liquid crystals 110 dispersed in a polymer (not shown) that are substantially well aligned in the z-direction when exposed to the electric field $E_a$. Light 116 enters the polymer along the x axis and propagates through the PDLC experiencing a first refractive index associated with the x axis of the liquid crystal.

Figure 1C:
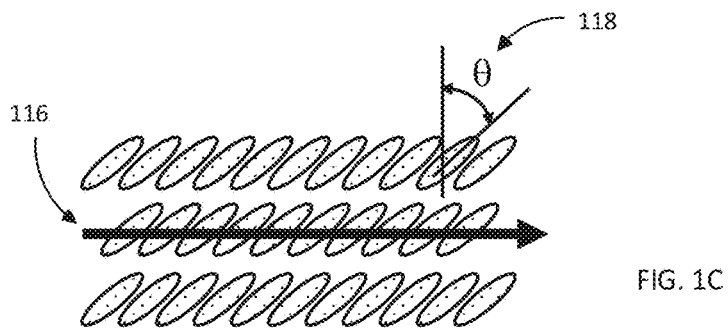
FIG. 1C shows an array of liquid crystals dispersed in a polymer that are askew from the z axis by an angle when exposed to an electric field $E_b$, according to one example embodiment.

FIG. 1C shows an array of liquid crystals 110 dispersed in a polymer that are askew from the z axis by an angle θ 118 when exposed to an electric field $E_b$. Light 116 enters the polymer along the x axis and propagates through the PDLC experiencing a second refractive index associated with the askew orientation of the liquid crystal 110. The refractive index can be dependent on the degree of skew away from the z axis and be some refractive index between $n_e$ and $n_0$, or the refractive index can be any other value for the refractive index $n_i$ based on the skewed orientation of the liquid crystals.

While not pictured, the liquid crystals 110 may not fully align with respect to one another when exposed to an electric field, e.g. when exposed to the electric field $E_a$ a few of the liquid crystals may be slightly askew (e.g. at $\theta_1$) while others may be more or less askew (e.g. at $\theta_n$). Additionally, when changing between electric fields, e.g. $E_a$ to $E_b$, the liquid crystals may take some time to realign and not all crystals may realign at the same speed or to the same orientation. The liquid crystals may also not be regularly spaced as illustrated and may be more densely spaced in certain areas of the polymer than other areas. While all of these effects may affect the aggregate optical properties of the PDLC devices described within, the effects do not compromise the general functionality of the PDLC device.

Tunable PDLC Layers

Figure 2A:
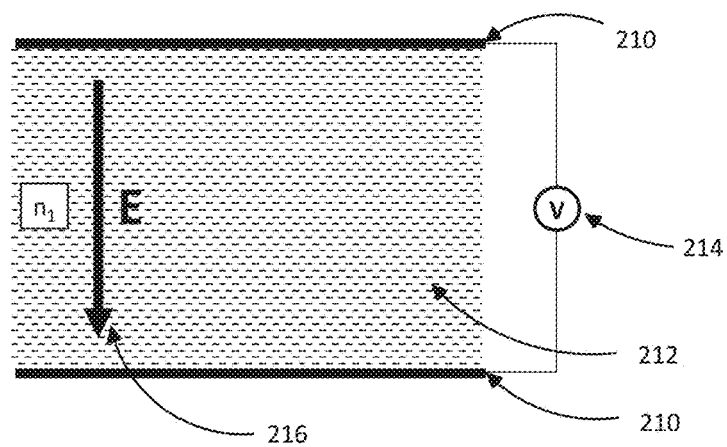
FIG. 2A shows a PDLC between two electrical contacts in which the PDLC has a first refractive index $n_1$ when exposed to the electric field between the two electrical contacts generated by an external voltage source, according to one example embodiment.

FIG. 2A shows a cross-section of a PDLC between two transparent electrical contacts 210 in which the PDLC 212 has a first refractive index $n_1$ when exposed to the electric field between the two electrical contacts generated by an external voltage source 214. In the example of FIG. 2A the electrical contacts can be an optically transparent electrodes that can have a constant voltage across the entirety of the electrode, similar to parallel plate capacitors. The refractive index $n_1$ of the PDLC is an aggregate refractive index for the configuration of all elements within the PDLC, e.g. optical characteristics of the polymer and optical characteristics of the liquid crystals. The aggregate refractive index is additionally dependent on the orientation of the liquid crystals within the polymer. Generally, when the PDLC is unaffected by an electric field the orientation of the liquid crystals within the PDLC is randomized and the PDLC has a different aggregate refractive index.

The electrodes 210 can be biased with a voltage V 214 such that there is an electric field E 216 between the two contacts. The electric field changes the orientation $\theta$ of the liquid crystals within the PDLC, i.e. $\theta$ is $\theta(E)$, and changes the refractive index of the PDLC 212, i.e. n is $n(\theta)$ and, therefore, n is $n(\theta(E))$. Based on this dependency, light entering the PDLC 212 will experience the refractive index based on the electric field. In some embodiments, the refractive index can be continuously variable on the electric field E 216 while in other embodiments the refractive index may be discontinuously variable on the electric field E 216. For example, in a PDLC 212 with a discontinuous variation on electric field, the refractive index may be one value for a first range of electric fields and another value for another range of electric fields, etc. In a PDLC with a continuous variation on electric field, for each value of the electric field E the refractive index may have a different value. In still other configurations, the refractive index of the PDLC 212 may be based on the electric field 216 in any combination of a discontinuous and continuous manner, i.e. the refractive index is a first value for a first range of electric fields and continuously variable based on the electric field E 216 in for all other electric fields.

Figure 2B:
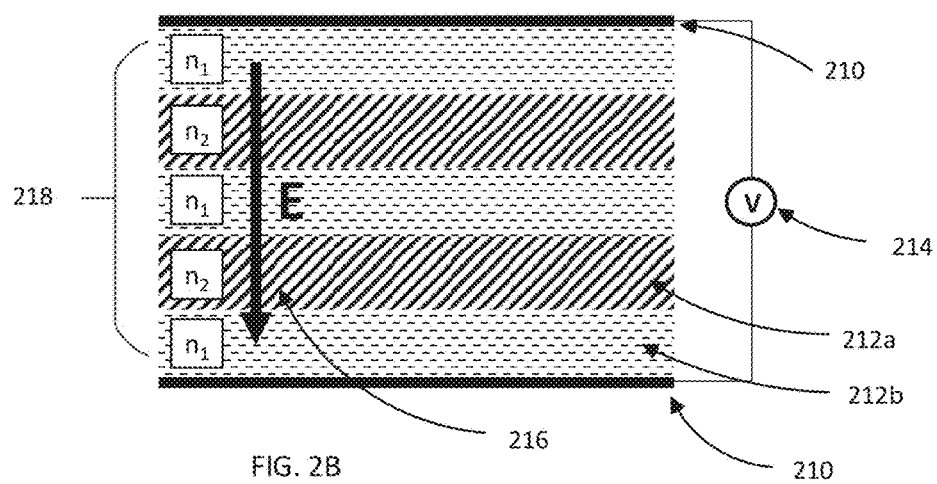
FIG. 2B shows a repetitive array of two alternating PDLC layers between two electrical contacts in which each alternating PDLC layer has a different refractive index when exposed to the electric field between the electrical contacts generated by an external voltage source, according to one example embodiment.

FIG. 2B shows a repetitive array of two alternating PDLC layers 212a and 212b between two transparent electrical contacts 210 in which each alternating PDLC layer has a different refractive index, e.g. $n_1$ and $n_2$, when exposed to the electric field E 216 between the electrical contacts 210 generated by an external voltage source V 214. In example of FIG. 2B the electrical contacts can be an optically transparent electrodes that has a constant voltage across the entirety of the electrode, similar to parallel plate capacitors.

The refractive indices of the two repetitive PDLC layers are refractive indices based on all elements of the PDLC, e.g. optical characteristics of the polymer and optical characteristics of the liquid crystals. The aggregate refractive index of the entire PDLC array 218 (i.e. all of the PDLC layers between two contacts) is a function based on the repetitive layers, e.g. $n_3(E) = n_1(\theta(E)) \Pi n_2(\theta(E))$ where $\Pi$ is some function indicating a relationship between the repetitive layers of $n_1$ and $n_2$. The aggregate refractive index $n_3$ can also be dependent on the thickness of the overall stack, the number of repetitions of each layer, the interface interactions of the layers, the thickness of each layer, the relative thickness of each layer, the shape of the layers, the relative shape of the layers, or any other similar consideration that may change the aggregate optical characteristics of the PDLC array 218.

Figure 2C:
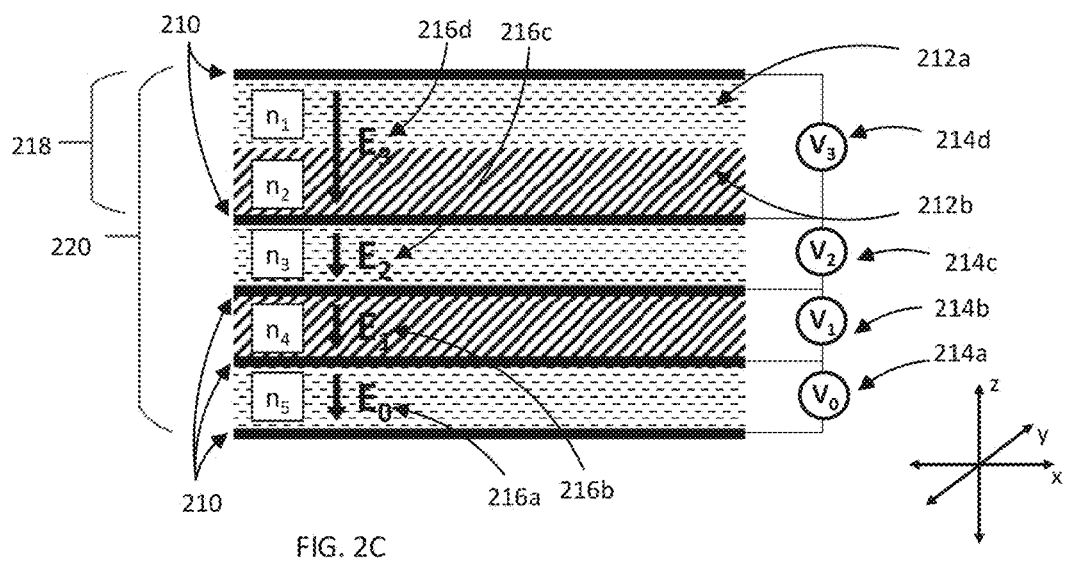
FIG. 2C shows a stack of repetitive arrays of two alternating PDLC layers between several electrical contacts in which each alternating PDLC layer has a different refractive index that when exposed to the electric fields between the electrical contacts generated by an different external voltage sources, according to one example embodiment.

FIG. 2C shows a repetitive array of two alternating PDLC layers 212a and 212b between several transparent electrical contacts 210 in which each alternating PDLC layer has a different refractive index, e.g. $n_1$, $n_2$, $n_i$, etc., when exposed to the electric fields between the electrical 210 contacts generated by an different external voltage sources $V_i$ 214. The repetitive array of FIG. 2C is similar to the repetitive array of FIG. 2B, but the array of FIG. 2C has added contacts 210 and voltages (e.g. $V_i$) that separate layers of the repetitive array. The added contacts allow individual control of the electric field $E_i$ 216 for individual PDLC layers (or combination of PDLC layers) of the array giving enhanced control to the aggregate refractive index of the PDLC stack. Generally, the PDLC stack 220 can be any number of PDLC arrays 218 separated by any number of contacts 210.

Figure 2D:
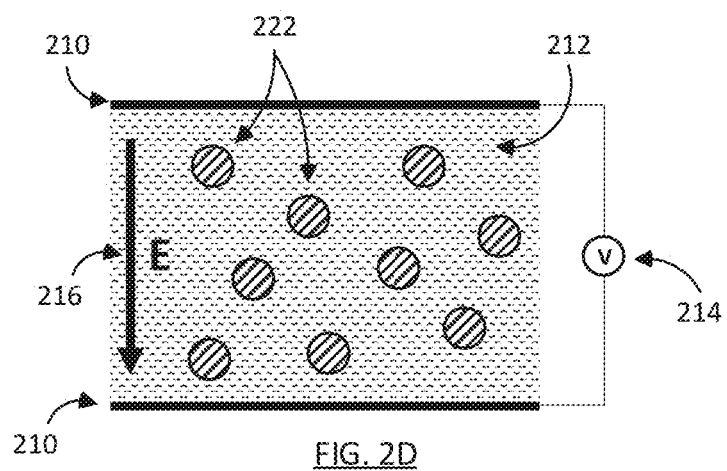
FIG. 2D shows a PDLC layer with volumetric areas of a different refractive index that when exposed to an electric field between the electrical contacts generated by an external voltage source, according to one example embodiment.
Figure 2E:
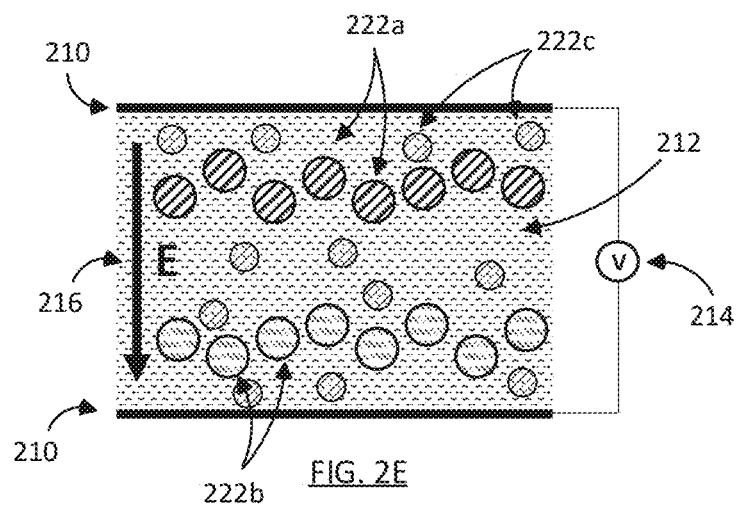
FIG. 2E shows a PDLC layer with various volumetric areas of differing refractive indexes dispersed in a PDLC layer, the volumetric areas arranged in differing manners, according to one example embodiment.

FIG. 2D shows a PDLC layer 212 between several transparent electrical contacts 210 with a first refractive index, e.g. $n_1$, and volumetric areas 222 with a second refractive index, e.g. $n_2$, when exposed to the electric field between the electrical contacts generated by an external voltage source V 214. The volumetric areas 222 are regions within the PDLC layer in which the applied electric field 216 creates an area of a different refractive index. The volumetric areas within the PDLC layer contribute to the aggregate refractive index of the PDLC stack. Generally, the PDLC layer can have any number and size of volumetric areas arranged in type of ordering (e.g., layered, random, clustered, etc.). Further, the volumetric areas within the PDLC area can have any number of refractive indexes (e.g. n1, n2, . . . , ni) rather than just the illustrated two refractive indexes. FIG. 2E shows an example of a PDLC layer with a first refractive index including volumetric regions having a second 222a and third 222b refractive index loosely arranged in a layers within the PDLC layer, and volumetric regions with a fourth refractive index 222c randomly distributed within the PDLC layer.

In some configurations, there may be no electrical contacts to any layer of the PDLC array and the refractive index of each constituent layer and the aggregate refractive index may be a singular value that is not dependent on the electric field. In other configurations, the electrical contacts may contact one edge of the PDLC layer and the electric field is generated between the contacted edge and another 'floating' edge(s) of the PDLC layer.

While all of the layers 212 of the arrays 218 and stacks 220 of FIGS. 2A-2C have been tunable PDLC layers, in some configurations some of the layers can be other materials that are not tunable by an electric field. Additionally, all of the layers 212 illustrated in FIGS. 2A-2C have been parallel alternating layers; however, layers of the array and stack can take any shape (e.g. triangular, arcs, circles, half circles, etc.).

Control Schema for Tunable PDLC Layers

As described in FIGS. 2A-2E, the electrical contacts of a PDLC array are generally transparent electrodes that apply a constant voltage to opposing sides of the PDLC array. This configuration applies a nearly constant electric field E across the entirety of the PDLC array and does not create variably shaped and tunable electric fields. Described below are electrical contacts that allow for the generation of variably shaped and tunable electric fields using variable sheet resistors as electrical contacts to the PDLC layers.

Rectangular Sheet Resistors

Figure 3A:
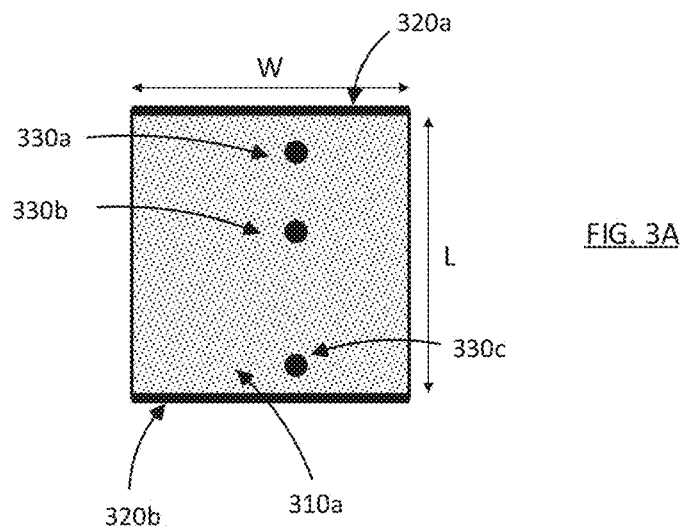
FIGS. 3A and 3B shows rectangular sheet resistors with electrodes on two sides that can be used as the upper and lower contact to generate tunable electric fields within the PDLC layers to vary the optical properties of the layer.
Figure 3B:
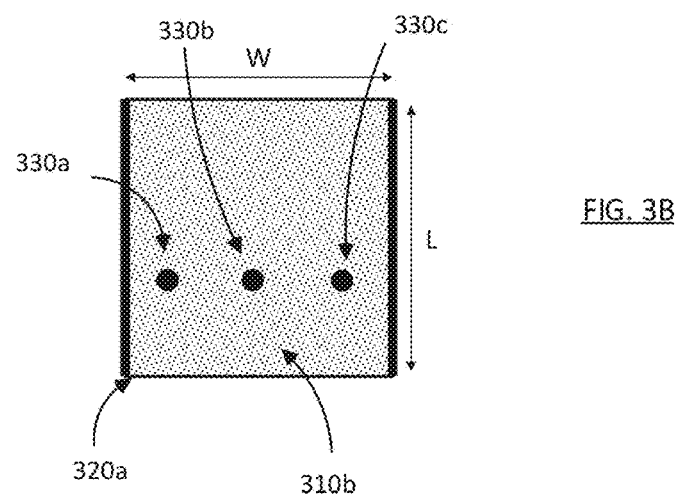

FIGS. 3A-3B shows planar views of rectangular sheet resistors 310 with electrodes 320 on two sides. The sheet resistors that can be used as the upper and lower contacts (e.g. the transparent electrodes 210 of FIGS. 2A-2C) to generate tunable electric fields within the PDLC layers to vary the optical properties of the layer.

In the illustrated example of FIG. 3A the rectangular sheet resistor 310a is electrically contacted to electrodes 320 that run across the width of the sheet resistor with each electrode on an opposite edge. The electrodes 320 can be coupled to a voltage source (not pictured) that can apply a first voltage to one electrode 320a and a second voltage to the opposing electrode 320b (more generally, applying a voltage differential between the two contacts 320) such that a voltage drop across the sheet resistor 310a can be induced. The voltage drop may cause the voltage at any point 330 along the length of the sheet resistor 310a to be different, e.g. the voltage at the first point 330a may be different than the voltage at the second point 330b and the voltage at the third point 330c. In the illustrated example of FIG. 3B, the rectangular sheet resistor 310b is similarly configured to the example of FIG. 3A with the electrodes 320 contacted along the length sides of the sheet resistor 310b. In the configuration of FIG. 3B the voltage drop may cause the voltage at any point along the width of the resistor to be different, e.g. the voltage at the first point 330a may be different than the voltage at the second point 330b and the voltage at the third point 330c.

Figure 3C:
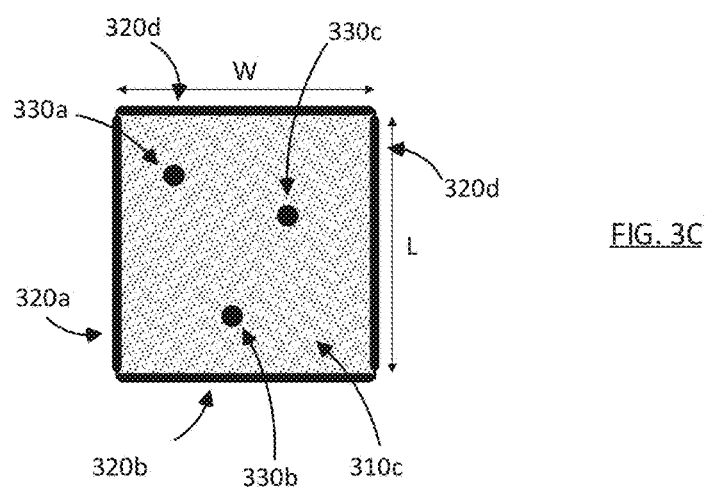
FIG. 3C shows a rectangular sheet resistor with electrodes on four sides that can be used as the upper and lower contact of a PDLC device to generate a tunable electric field within the PDLC layers to vary the optical properties of the layers.

FIG. 3C shows a planar view of a rectangular sheet resistor 310c with electrodes 320a-d on all four sides. The rectangular sheet resistor 310c could be used as the upper and lower contact of a PDLC device to generate a tunable electric field within the PDLC layers to vary the optical properties of the layers. Having electrodes 320 on four sides of the variable sheet resistor allows for tuning the voltage drop across the sheet resistor in two-dimensions, e.g. the voltage at the first point 330a may be different than the voltage at the second point 330b and the voltage at the third point 330c.

Figure 3D:
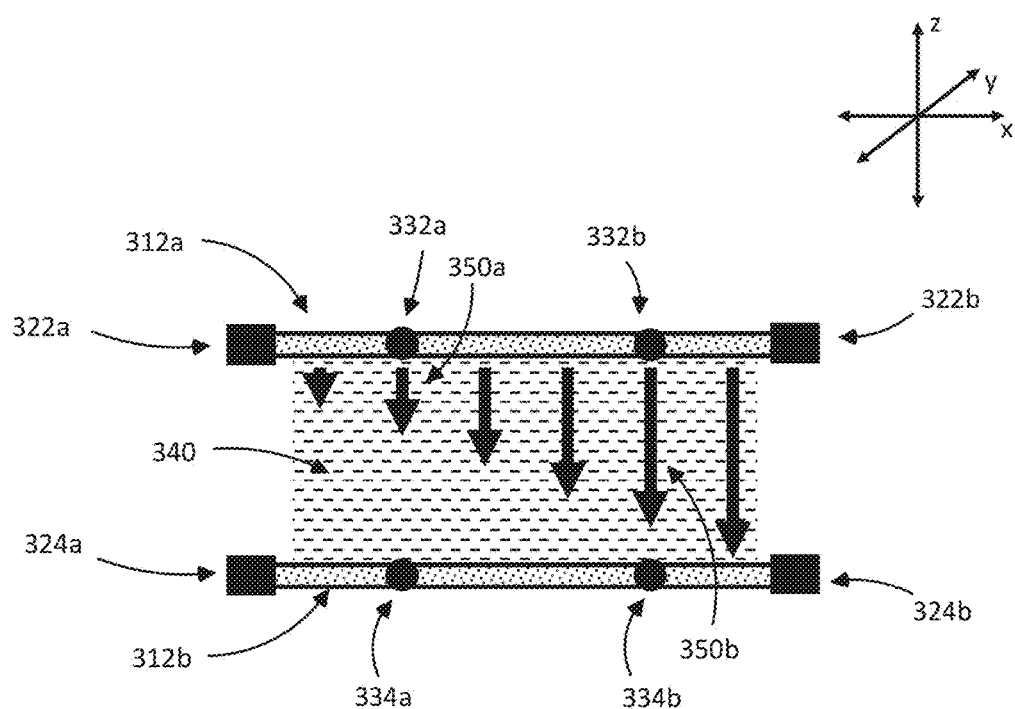
FIG. 3D shows a cross section of a PDLC array with rectangular sheet resistors on the top and bottom side of the PDLC layers, according to one example embodiment.

FIG. 3D illustrates a side view of a PDLC array 340 with two rectangular sheet resistors 312 on opposite sides of the PDLC array, each sheet resistor 312 with an electrical contact 320 on each side of the sheet resistor 312. The PDLC array 340 can have any number of PDLC layers in any configuration (similar to FIGS. 2A-2B). The top sheet resistor 312a has a voltage drop between the top two electrodes 322 and the bottom sheet resistor 312b has a voltage drop between the bottom two electrodes 324. The voltage at the first point 332a on the top sheet resistor 312a is different from the voltage at the second point 332b on the top sheet resistor 312a. Similarly the voltage at the first point 334a on the bottom sheet resistor 312b is different from the voltage at the second point 334b on the bottom sheet resistor 312b. The voltage drops can be configured such that the electric field E 350a between the first point 332a on the top sheet resistor 312a and the first point 334a on the bottom sheet resistor 312b is different from the electric field E 350b between the second point 334a on the top sheet resistor 312a and the second point 334b on the bottom sheet resistor 312b. The variation of the electric field 350 between the top 312a and bottom 312b sheet resistor, or the electric field profile, can be tuned by controlling the voltages applied to the electrodes 322. Tuning the electric field profile can be used to control the refractive index of the PDLC array 340.

In configurations where the sheet resistors 312 of FIG. 3D are similar to the sheet resistors 310a of FIG. 3A (or the sheet resistors 310b FIG. 3B), the electric field profile can be controlled in one dimension. In configurations where the sheet resistors 312 of FIG. 3D are one sheet resistor 310a of FIG. 3A and one sheet resistor 310b of FIG. 3B (note that the bottom contacts are shown as a cross-section in this configuration), the electric profile can be controlled in two dimensions (i.e, on voltage drop side to side in the orientation of FIG. 3D, and one voltage drop into and out of the plane of FIG. 3D). In configurations where the sheet resistors 312 of FIG. 3D include a sheet resistor 310c of FIG. 3C the electric field profile can be controlled in two dimensions.

Figure 3E:
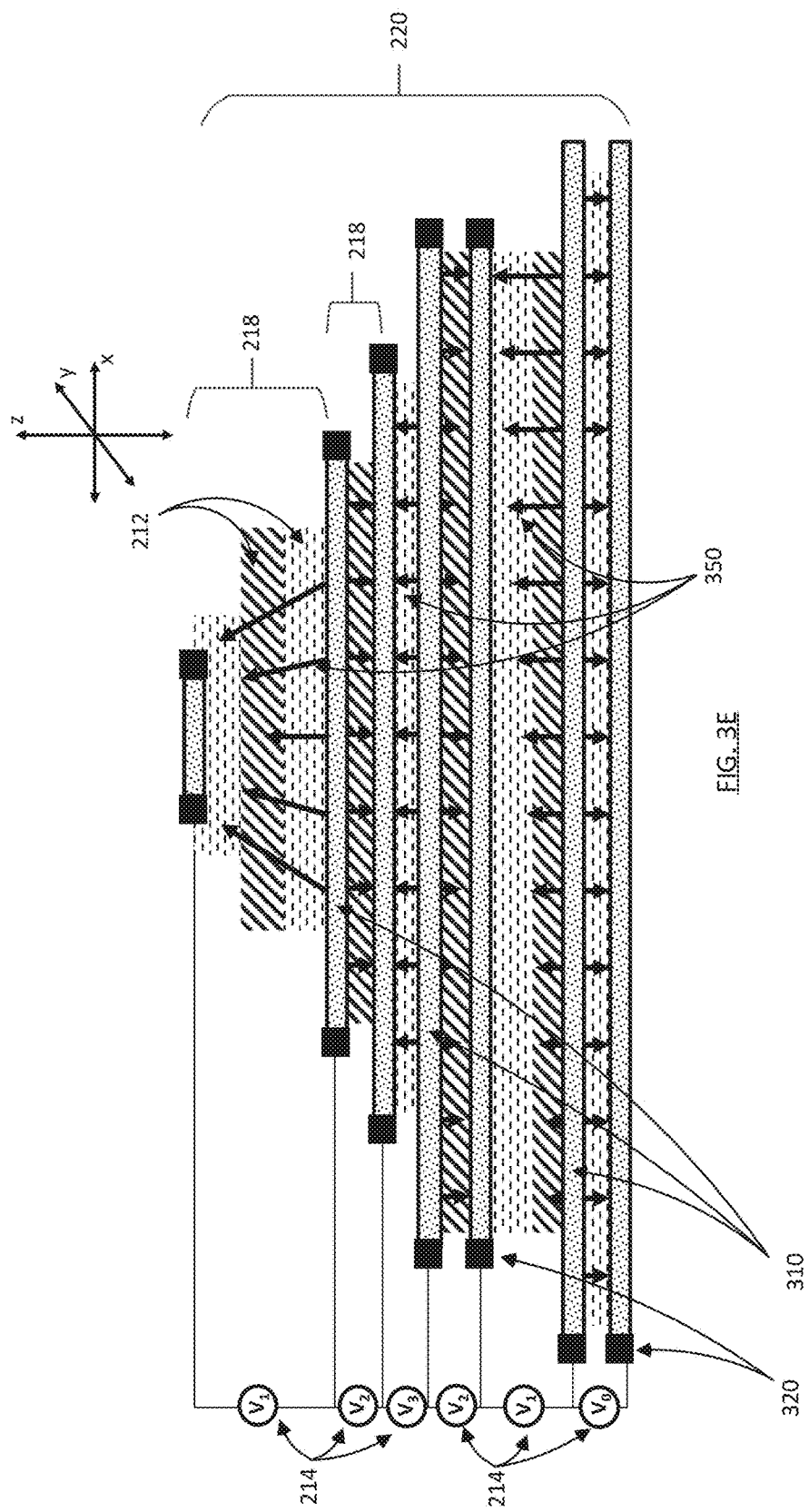
FIG. 3E shows a cross section of a PDLC stack with rectangular sheet resistors controlling a variety of PDLC arrays in the stack, according to one example embodiment.

FIG. 3E shows a cross section of an example PDLC stack 220 separated by sheet resistors 310 with voltages 214 applied to the contacts 320 of each sheet resistor 310 such that voltage differentials exist between the sheet resistors. The voltage differentials between the sheet resistors 310 create an electric field E 350 that controls the refractive index of the PDLC array 218 between the two resistors 310. Controlling the electric field profiles(s) with the applied voltage(s) controls the aggregate refractive index n(E) of the PDLC stack 220 to affect the optical characteristics of the PDLC stack 220.

The illustrated example of FIG. 3E is a demonstration of possibility. The PDLC arrays 218, contacts 320, and applied voltages 214 can take any shape/size and can be in any configuration. For example, each PDLC array 218 of the PDLC stack 220 can have any number of PDLC layers 212 (e.g. 1, 2, 3, ... n) with each PDLC layer 212 having any number of characteristics and optical properties. The PDLC stack 220 can have any number of PDLC arrays 218 separated by any number of sheet resistors 310 (or electrodes 210) and can have any number of aggregate characteristics and optical properties. The PDLC arrays 218 and sheet resistors 310 can be any shape or orientation and have any number of electrical contacts 320. There can be any number of voltage 214 sources and any number of potential differences between the sheet resistors 310 such that the electric fields 350 can control any number of electric field profiles of the PDLC array(s). The electric field profile(s) control the aggregate refractive index and optical characteristics of the PDLC stack 220. There can be any number or type of electric field profiles to control the aggregate refractive index. As examples, the electric fields 350 of FIG. 4C can be in any direction, be continuously variable on E, be discretely variable on E, be in different directions, be non-perpendicular to the PDLC layers, etc.

Circular Sheet Resistors

Figure 4A:
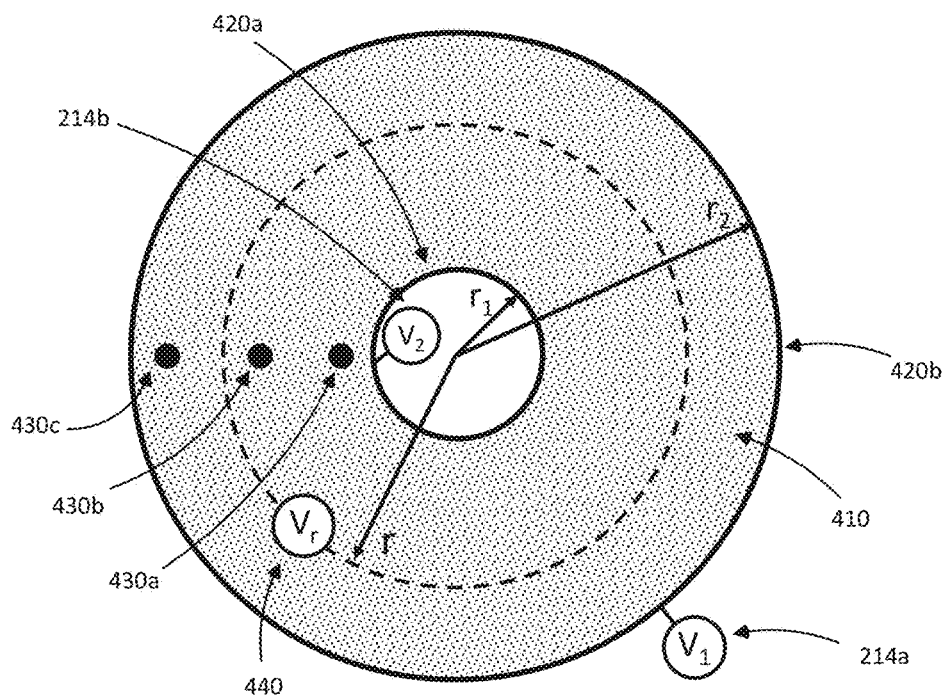
FIG. 4A shows a circular sheet resistor annulus with electrodes on an inner ring and an outer ring can be used as the upper and lower contact of to generate tunable electric fields within the PDLC layers to vary the optical properties of the layer, according to one example embodiment.

FIG. 4A shows a planar view of a circular sheet resistor annulus 410 with an electrode 420a connected to the inner circumference and an electrode 420b coupled to the outer circumference 420b. The circular sheet resistor annulus 410 can be used at the upper and lower contact of a PDLC array 218 or PDLC stack 220 (i.e. FIGS. 2A-2C) to generate tunable electric fields within the PDLC layers 212 to vary the optical properties of the layers 212, arrays 218, and stacks 220. The circular sheet resistor 410 is configured as an annulus with an inner radius $r_1$ and an outer radius $r_2$. There can be an electrode 420a coupled along the circumference of the inner radius and electrode 420b coupled along the circumference of the outer radius. The electrodes 420 can be coupled to a voltage source 214a that can apply a first voltage $V_1$ to one electrode and a voltage source 214b that can apply a second voltage $V_2$ to the opposing electrode such that a voltage drop across the circular 410 sheet resistor can be induced. The voltage drop may cause the radial voltage $V_r$ 440 at any point of differing radii to be different, e.g. the voltage at the first point 430a may be different than the voltage at the second point 430b and the voltage at the third point 430c. Further, the circular variable sheet resistor 410 can be any other radially dependent shape such as an oval, ellipse, etc. In some configurations there may be more than one electrode coupled to the outer circumference (e.g. an electrode across a first arc and an electrode across a second arc of the outer circumference) and more than one coupled to the inner circumference (e.g. an electrode across a first arc and an electrode across a second arc of the inner circumference). Alternatively, or additionally, there may be additional circular electrodes coupled at any point within the annulus (e.g. along a third radius r).

Figure 4B:
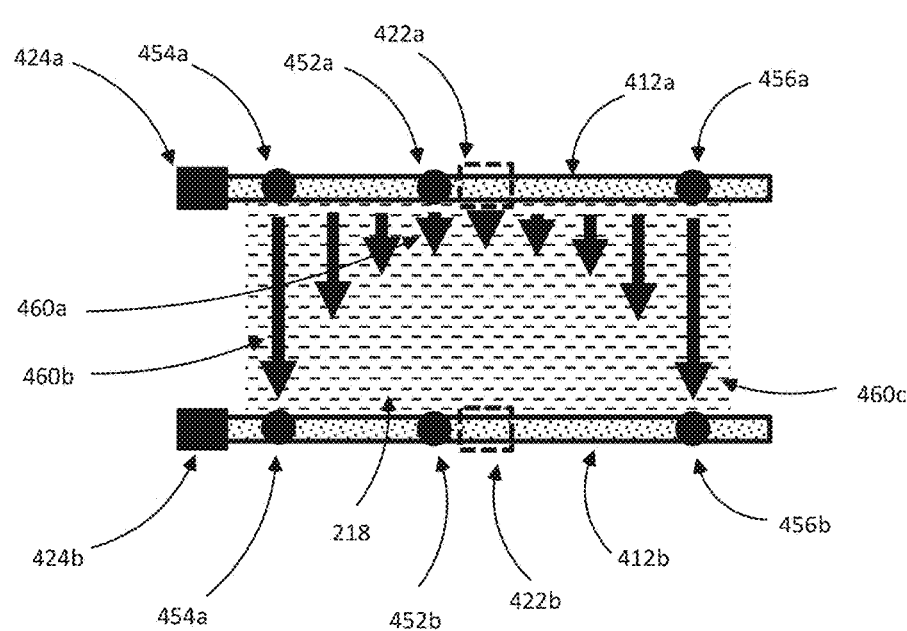
FIG. 4B shows a cross section of a PDLC array with circular sheet resistor annulis on opposing sides of the array, according to one example embodiment.

FIG. 4B illustrates a side view of a PDLC array 218 (or PDLC stack 220) with two circular sheet resistors 412a and 412b on opposite sides of the PDLC array, each circular sheet resistor 412 with an electrical contact 422 on an inner circumference and an electrical contact 424 on the outer circumference. The PDLC array 218 can have any number of PDLC layers in any configuration (similar to FIGS. 2A-2B). The top circular sheet resistor 412a has a voltage drop between the inner circumference electrode 422a and outer circumference electrode 424a and the bottom sheet resistor has a voltage drop between the inner circumference electrode 422b and the outer circumference electrode 424b. The voltage at the first point 452a on the top circular sheet resistor 412a is different from the voltage at the second point 454a on the top circular sheet resistor 412a. Similarly the voltage at the first point 452b on the bottom circular sheet resistor 412b is different from the voltage at the second point 424b on the bottom circular sheet resistor 412b. The voltage drops can be configured such that the electric field E 460a between the first point 452a on the top circular sheet resistor 412a and the first point 452b on the bottom circular sheet resistor 412b is different from the electric field E 460b between the second point 454a on the top sheet resistor 412a and the second point 454b on the bottom circular sheet resistor 412b. As the circular sheet resistors 412 vary radially, the voltage at the third point 456a on the top sheet resistor 412a is equivalent to the voltage at the second point 454a of the top circular sheet resistor 412a (i.e. they are at the same radius). Similarly for the voltages of the third 456b and second points 454b on the bottom sheet resistor 412b. Thus, the electric field E 460c between the third point 456 on the top and bottom circular sheet resistor 412 is equivalent to the electric field E 460b between the second point 454 on the top and bottom circular sheet resistor 412. The variation of the electric field 460 between the top and bottom circular sheet 412 resistors, or the electric field profile, can be tuned by controlling the voltages applied to the electrodes. Tuning the electric field profile can be used to control the refractive index and optical properties of the PDLC array 218. In configurations where the sheet resistors of FIG. 4C are similar to the sheet resistors of FIG. 4A, the electric field profile can be controlled in a radial direction.

FIG. 4C shows a cross section of an example PDLC stack 220 separated by circular sheet resistors 410 with voltages applied to the inner and outer circumference contacts 420 of each circular sheet resistor 410 such that voltage drops exist between the contacts 420 within the sheet resistors 410. The voltage differentials between the sheet resistors create an electric field E 460 that controls the refractive index of the PDLC arrays 218 between the variable resistors 410. Controlling the electric field profiles(s) with the applied voltage(s) controls the aggregate refractive index n(E) of the PDLC stack 220 to affect the optical characteristics of the PDLC stack 220.

The illustrated example of FIG. 4C is a demonstration of a possible PDLC stack according to one example embodiment. The PDLC arrays 218, contacts 420, and applied voltages 214 can take any shape/size and can be in any configuration. For example, each PDLC array 218 of the PDLC stack 220 can have any number of PDLC layers 212 (e.g. 1, 2, 3, . . . n) with each PDLC layer 212 having any number of characteristics and optical properties. The PDLC stack 220 can have any number of PDLC arrays 218 separated by any number of circular sheet resistors 410 and can have any number of characteristics and optical properties. The PDLC arrays 218 and circular sheet resistors 410 can be any shape or orientation and have any number of electrical contacts 420. There can be any number of voltage sources 214 and any number of potential differences between the circular sheet resistors 410 such that the electric fields 460 can be any number of electric field profiles of the PDLC array(s). The electric field profile(s) control the aggregate refractive index and optical characteristics of the PDLC stack 220. There can be any number or type of electric field profiles to control the aggregate refractive index. As examples, the electric fields 460 of FIG. 4C can be in any direction, be continuously variable on E, be discretely variable on E, be in different directions, be non-perpendicular to the PDLC layers, etc.

Tunable PDLC Lens Doublet

In optics, a doublet is a type of lens made up of two simple lenses paired together. Such an arrangement allows more optical surfaces, thicknesses, and formulations, especially as the space between lenses may be considered an "element." With additional degrees of freedom, the optical element has more latitude to correct more optical aberrations more thoroughly. Using a tunable PDLC layer as one of, or both of, the lenses of a doublet gives a greater amount of control to a lens doublet.

Figure 5A:
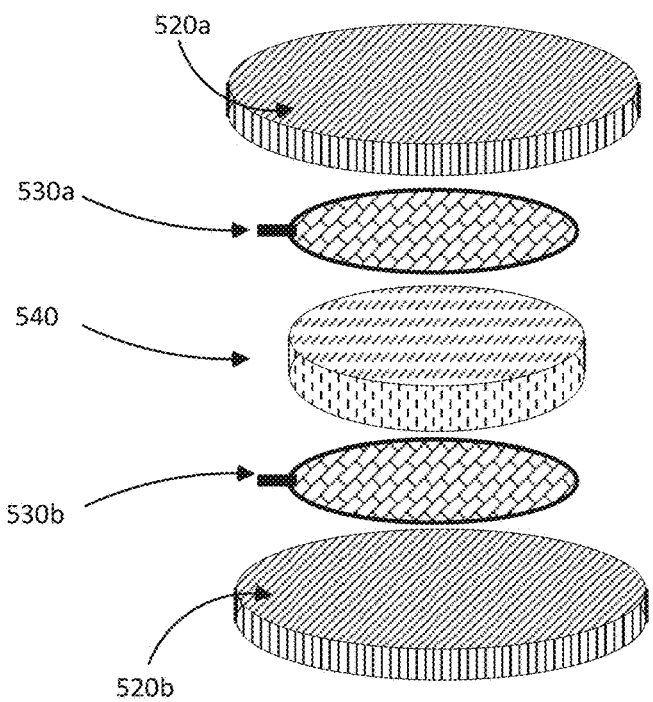
FIG. 5A shows an exploded isometric view of a tunable PDLC lens doublet, according to one example embodiment.

FIG. 5A shows an exploded isometric view of a tunable PDLC lens doublet 510, hereafter the lens double. The tunable PDLC lens doublet includes a top substrate 520a and a substrate 520b. The top and bottom substrates 520 can be substantially circular (or any other shape such as a cylinder, etc) and has at least a top side and a bottom side. The substrates 520 act as a mechanically supporting layer for tunable lens doublet 510. The substrate can be silicon, plastic, metal, or any other mechanically rigid material that can be used to support the tunable double 510.

The lens doublet also includes a top electrode 530a and bottom electrode 530b (e.g. an electrically conducting plate). The top electrode 530a is coupled to the bottom side of the top substrate 520a and the bottom electrode 530b is coupled to the top side of the bottom electrode 520b. The electrodes 530 are energized with an external voltage source (e.g. voltage source 214) to have a potential difference between the electrodes 530. The potential difference between the electrodes creates an electric field E (e.g. electric field E 216) between the electrodes 530. The induced electric field E is used to control the optical properties of the lens doublet 510.

The tunable PDLC lens doublet 510 also includes a tunable element 540. The tunable element 540 is coupled to the bottom side of the top electrode 530a and the top side of the bottom electrode 530b. The tunable element 540 can be similar to a PDLC array 218 described in FIGS. 2A-2C. The optical characteristics of the tunable element are configurable by an applied electric field E (e.g. electric field E 216). In the illustrated configuration, the applied electric field E is created by a potential difference between the two electrodes 530 coupled to opposing surfaces of the tunable element 540.

Figure 5B:
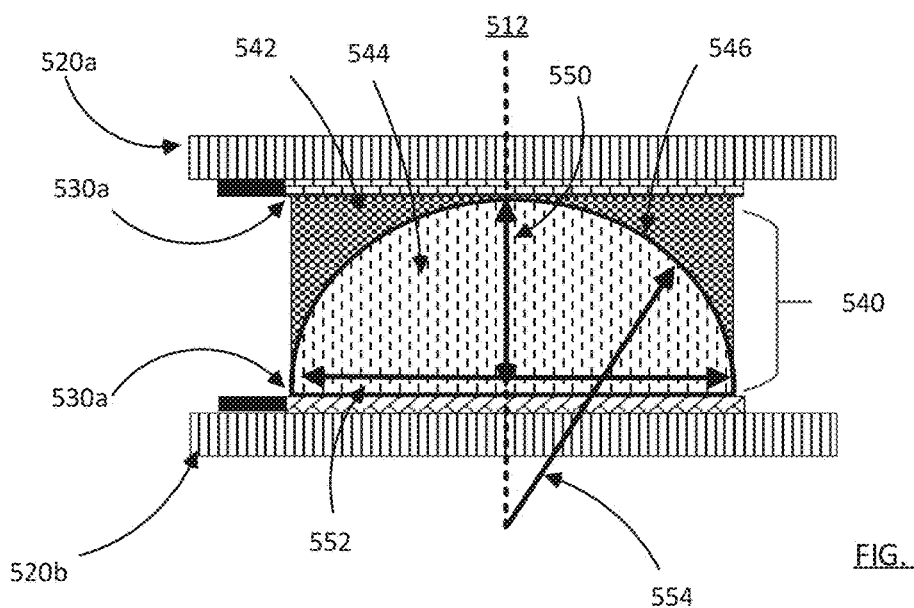
FIG. 5B shows a cross sectional view a tunable PDLC lens doublet, according to one example embodiment.

FIG. 5B illustrates a cross sectional view of the tunable PDLC lens doublet 510, according to one example embodiment. Similarly to FIG. 5A, the lens doublet includes a top substrate 520a, a top electrode 530a, a tunable element 540, a bottom electrode 530b, and a bottom substrate 520b. FIG. 5B illustrates a more detailed view of the tunable element 540. The tunable element 540 is a width L 550 where L is the distance between the top electrode 530a and the bottom electrode 530b. Additionally, the tunable element has a first diameter D 552, where the first diameter D (or twice the first radius r) is the distance between one side of the tunable element and the other side of the tunable element.

The tunable element includes an area of a material 542 with a non-tunable refractive index $n_1$ and an area of PDLC 544 with a tunable refractive index $n_2(E)$. Generally, the PDLC 544 is configured such that the layer is transmissive when a triggering electric field is applied. The triggering electric field configures elements within the PDLC layer such that the optical characteristics of the layer allow the transmission of light. In the illustrated embodiment, the boundary between the PDLC area 544 and the non-tunable area 542 is a spherical cap (indicated as the arc 546 in FIG. 5B). A spherical cap is the region of a sphere which lies above (or below) a given plane). The height of the spherical cap is L and the base radius is the first radius r. Generally the spherical cap has its respective peak aligned along the optical axis 512. The arc of the spherical cap is an arc of a sphere with the second radius R 554. In one embodiment, the applied electric field affects the shape and position of the arc (i.e. the size and position of the spherical cap).

When a refractive lens includes a surface that is a sector of a sphere (e.g. the tunable PDLC lens doublet 510) its surface profile is quadratic with its radius. Generally, refractive lenses have a uniform refractive index n with an optical path length (OPL) dependent on the distance between the front side of the lens and the back side of the lens, e.g. OPL(r)=n·L(r). The focal length of the tunable PDLC lens doublet is $$f = \frac{R * n_0}{n_2 - n_1} \quad (1)$$

where $n_0$ is the refractive index of the area surrounding the tunable PDLC lens doublet 510. The optical path length is dependent on the length:

$$L = R - \sqrt{R^2 - r^2} \rightarrow R = \frac{L^2 + r^2}{2 \cdot L} \quad (2)$$

The triggering electric field controls the refractive index $n_2(E)$ of the PDLC area 544. Generally, energizing the electrodes to create a specific electric field controls the optical properties of the tunable lens doublet. The refractive index of the PDLC area is discontinuously variable on the electric field, that is above a threshold it's a first value and below the threshold it's a second value. In some embodiments the first value (or second value) of the refractive index of the PDLC material can be equivalent to the refractive index of the non-tunable element. Further, the applied voltage creates a constant electric field between the two electrodes as described previously. The tunable electric field can control any of (or any combination of) the focal length of the tunable PDLC 510, chromatic aberration of the camera system, spherical aberration of the camera system, dispersion of the tunable element of camera system, or any other optical aberration (e.g. piston, tilt, defocus, coma, astigmatism, field curvature, axial, transverse, lateral, etc).

Tunable PDLC in an Lens Tube

Generally, the tunable PDLC optical elements are configured to function in a camera system. The tunable PDLC can be used in a lens tube for a camera system and can be in any position within the lens tube within an integrated image sensor system of a camera. An integrated image sensor and lens assembly may comprise a lens barrel holding a set of camera lens elements coupled to a lens mount. The lens mount is further coupled to an image sensor substrate that has an image sensor lying on an image plane. The optical distance between the set of lenses and the image sensor is tuned such that the focal plane of the lenses coincides with the image plane.

Figure 6:
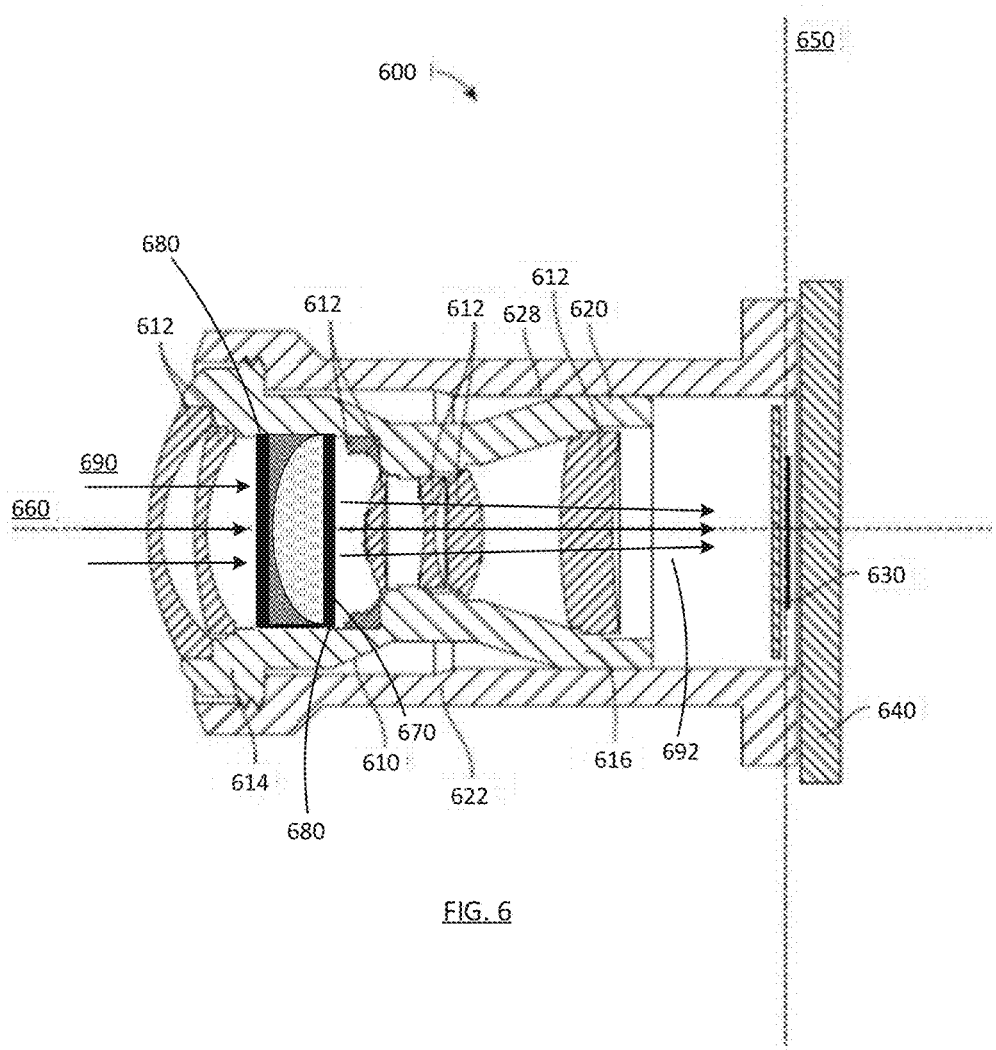
FIG. 6 illustrates a cross-sectional view of an embodiment of an integrated image sensor and lens assembly with a tunable lens element, according to one example embodiment.

As an example, FIG. 6 illustrates a cross-sectional view of an embodiment of an integrated image sensor substrate and camera lens system configuration 600 that may include a camera lens barrel 610, a camera lens mount 620, and an image sensor substrate 630, and a tunable optical element 670, and electrical contacts 680. The image sensor substrate 630 may have an image sensor assembly 640 for capturing images and/or video. The camera lens mount 620 may be physically affixed to the image sensor substrate 630 and also affixed to the camera lens barrel 610.

The lens barrel 610 may comprise one or more lens elements or other lens elements 612 to direct light to the image sensor assembly 630. The lens barrel 610 might be affixed to the lens mount 620 with a threaded joint at the end of the barrel arms 614 positioned to minimize the thermal shift of the focal plane relative to the image plane 650. The lens barrel 610 may comprise a lower portion 616, one or more barrel arms 614, and a lens window (which may be one of the lens elements 612). The lower portion 616 of the lens barrel 610 can be substantially cylindrical and structured to at least partially extend into the channel of the lens tube 622 portion of the camera lens mount 620. The barrel arms 614 may extend radially from the body of the lens barrel 610 and may be outside the channel of the lens mount 620 when assembled. The lens arms 614 may be used to physically couple the lens barrel 610 to the camera body 102 (not shown). The lens window might include optical components to enable external light to enter the lens barrel 610 and be directed to the image sensor assembly 640. The camera lens mount 620 may include a tube portion 622 that extends away from the image sensor assembly along the optical axis 660 and may include a substantially cylindrical channel for receiving the lens barrel 610. The back portion of the lens barrel 616 can be used for axial alignment relative to the lens mount 620.

The image sensor substrate 630 may comprise a printed circuit board for mounting the image sensor assembly 640 and may furthermore include various electronic components that operate with the image sensor assembly 640 or provide external connections to other components of the camera system. The image sensor assembly 640 might house an image sensor (e.g., a high-definition image sensor) for capturing images and/or video and may include structural elements for physically coupling the image sensor assembly 640 to the image sensor substrate 630 and to the camera lens mount 620. The image sensor of the image sensor assembly 640 might lie on an image plane 650. The combined focal plane of the lens elements 612 including the lens window and lens elements inside barrel 616 may be maintained to coincide with the image plane 650.

The lens barrel also includes a tunable optical element 670 (e.g. the lens doublet 510) between two lens elements 612 within the lens barrel 600. In some configurations, the tunable optical element 670 can be inserted into a lens element 612 (e.g one lens element is split in half such that the tunable optical element 670 is coupled to the two halves of the lens element 612. The tunable optical element 670 is coupled to the lens mount 620 such the tunable optical element 670 is centered about the optical axis 650. The tunable optical element is further coupled to electrical contacts 680 such that a voltage applied between the contacts configures the optical characteristics of the tunable optical element 670. In the illustrated embodiments, light 690 is incident upon the optical elements 612 and focused within the lens tube. The light is the incident upon the tunable optical element 670. The electrical contacts 680 have applied a voltage to the tunable optical element 670 to configure the tunable optical element to modify the optical paths 692 of the incoming light to reduce the spherical aberration of the lens tube. The tunable optical element 680 is further configured to reduce the amount of astigmatism of the optical system of the lens tube. The optical properties of the tunable optical element 670 can be configured in any number of manners previously described.

Example Camera System Configuration

Figure 7:
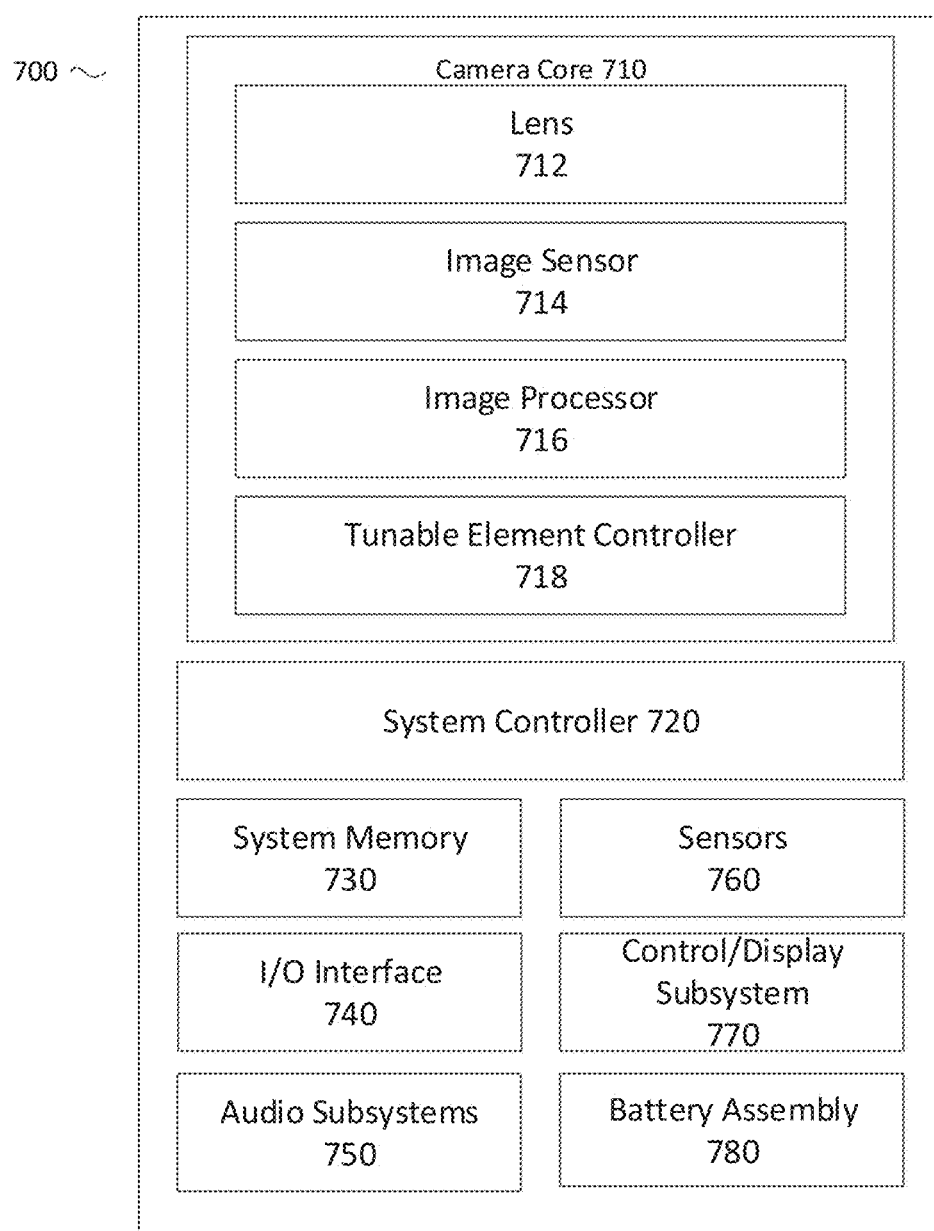
FIG. 7 illustrates a camera system architecture, according to one example embodiment

FIG. 7 is a block diagram illustrating a system level example camera architecture 700 corresponding to the camera demonstrated in FIGS. 7A-7D. The camera architecture 700 may include a thermal management system for a camera battery. The thermal management system may be configured for operation in low ambient temperature environments. The camera architecture 700 may include a camera core 710, a system controller 720, a system memory 730, an I/O interface 740, an audio subsystem 750, sensors 760, a control/display subsystem 770, a battery assembly 770, and a heat coupler 790. The camera core may include a lens 712, an image sensor 714, and an image processor 716, and a tunable element controller 718.

The components in FIG. 7 are grouped functionally and do not necessarily reflect a physical architecture of the camera architecture 700. For example, as described above, in one embodiment, the control/display subsystem 770 is embodied in a separate physical integrated circuit chip from the image processor 716. The integrated circuit chip including the image processor 716 also may include, for example, the image sensor 712, the system controller 720, the tunable element controller 718, system memory 730 and portions of the audio sub-system 750, I/O interface 740, and control/display sub-system 770.

In the example embodiment illustrated in FIG. 7, the camera architecture 700 has a camera core 710 that may include a lens 712, an image sensor 714, and an image processor 716, and tunable element controller 71. The camera architecture 700 additionally may include a system controller 720 (e.g., a microcontroller or microprocessor) that controls the operation and functionality of the camera architecture 700. The camera architecture 700 may include system memory 730 configured to store executable computer instructions that, when executed by the system controller 720 and/or the image processors 716, perform the camera functionalities described hereafter. In some example embodiments, a camera architecture 700 may include multiple camera cores 710 to capture fields of view in different directions which may then be stitched together to form a cohesive image. For example, in an embodiment of a spherical camera system, the camera architecture 700 may include two camera cores 710 each having a hemispherical or hyper hemispherical lens that each capture a hemispherical or hyper-hemispherical field of view which are stitched together in post-processing to form a spherical image. In other embodiments, multiple camera cores 710 may operate in separate cameras and be integrated via the I/O interface 740. For example, in an embodiment of a camera array system, the camera architecture may include at least two camera cores on at least two different cameras connected via the I/O interface 740 whose images are stitched together in post-processing to create a larger camera image.

The lens 712 can be, for example, a wide angle lens, hemispherical, or hyper hemispherical lens that focuses light entering the lens to the image sensor 714 which captures images and/or video frames. The image sensor 714 may capture high-definition video having a resolution of, for example, 470p, 720p, 1070p, 4k, or higher, or any other video resolution. For video, the image sensor 714 may capture video at frame rates of, for example, 30 frames per second, 60 frames per second, or higher, or any other possible frame rates. The image processor 716 performs one or more image processing functions of the captured images or video. For example, the image processor 716 may perform a Bayer transformation, de-mosaicing, noise reduction, image sharpening, image stabilization, rolling shutter artifact reduction, color space conversion, compression, or other in-camera processing functions. The image processor 716 may furthermore perform the timing metric calculations. The timing metric calculations may include determining frame rates, shutter speeds, exposure times, battery lifetimes, rate of change of battery lifetimes, time stamping of image, or similar. Processed images and video may be temporarily or persistently stored to system memory 730 and/or to a non-volatile storage, which may be in the form of internal storage or an external memory card. Additionally, the image processor may be configured to capture video or images and not store them in the system memory 730.

The tunable element controller 718, can be any element of the camera configured to control the optical characteristics of the tunable element of the camera system. This can include a signal processor configured to interpret control signals and apply voltages to electrodes coupled to the tunable element of the camera system. Generally, the tunable element controller 718 interprets the control signals and applies a voltage to the electrodes such that the electric field profiles of the tunable element configures to tunable element to achieve a desired optical property or refractive index. The tunable element controller 718 can also be coupled to other components of the camera system 700 to further control the tunable element.

An input/output (I/O) interface 740 may transmit and receive data from various external devices. For example, the I/O interface 740 may facilitate the receiving or transmitting video or audio information through an I/O port. Examples of I/O ports or interfaces include USB ports, HDMI ports, Ethernet ports, audio ports, and the like. Furthermore, embodiments of the I/O interface 740 may include wireless ports that can accommodate wireless connections. Examples of wireless ports include Bluetooth, Wireless USB, Near Field Communication (NFC), and the like. The I/O interface 740 may also include an interface to synchronize the camera architecture 700 with other cameras or with other external devices, such as a remote control, a second camera, a smartphone, a client device, or a video server.

Sensors 760 may capture various metadata concurrently with, or separately from, video capture. For example, the sensors 760 may capture time-stamped location information based on a global positioning system (GPS) sensor, and/or an altimeter. Other sensors 760 may be used to detect and capture orientation of the camera architecture 700 including, for example, an orientation sensor, an accelerometer, a gyroscope, or a magnetometer. Additional sensors may be used to detect and capture information about the camera system such as internal or external temperature of camera components such as the camera core, the system controller or the battery assembly. The sensors may additionally detect the presence of liquids within or external to the camera body or the proximity of liquids to camera components. The sensors may also be configured to monitor the integrity of camera components such as microphones, speakers, membranes, lenses, or any other component of the camera coupled to a sensor. The sensors may also comprise components capable of monitoring position, pressure, time, velocity, acceleration or similar.

Sensor data captured from the various sensors 760 may be processed to generate other types of metadata. For example, sensor data from the accelerometer may be used to generate motion metadata, comprising velocity and/or acceleration vectors representative of motion of the camera architecture 700. Sensor data from a GPS sensor can provide GPS coordinates identifying the location of the camera architecture 700, and the altimeter can measure the altitude of the camera architecture 700. In one embodiment, the sensors 760 are rigidly coupled to the camera architecture 700 such that any motion, orientation or change in location experienced by the camera architecture 700 is also experienced by the sensors 760. The sensors 760 furthermore may associate a time stamp representing when the data was captured by each sensor. In one embodiment, the sensors 760 automatically begin collecting sensor metadata when the camera architecture 700 begins recording a video. In still other embodiments the sensors may be external to the camera body and transmit the sensor data or sensor metadata to the camera via the I/O interface 740.

A control/display subsystem 770 includes various control and display components associated with operation of the camera architecture 700 including, for example, LED lights, a display, buttons, microphones, speakers, and the like. The audio subsystem 750 includes, for example, one or more microphones and one or more audio processors to capture and process audio data correlated with video capture. In one embodiment, the audio subsystem 750 includes a microphone array having two or more microphones arranged to obtain directional audio signals.

The battery assembly 770 may include power cells for powering various components of the camera system. For example the power cells may be a Lithium-Ion battery, a Nickel-Cadmium battery, a Nickel-metal-Hydride battery, a Lithium-Polymer battery, a Lead-Acid battery, a solar-cell, a power cord to an external power source, a kinetic power generation system, or any other component used to power an electrical system. The battery assembly may be configured to be controlled by the system controller 720, with the system controller dictating which components of the camera sub-systems and components will receive power during operation. The battery assembly 770 may be controlled by various input mechanisms (such as buttons, switches, and touch-screen mechanisms) on the external body of the camera or by directions received via the I/O interface 160. Additionally, the battery assembly 770 may be removable from the camera system to allow for recharging the power cells of the battery assembly or replacing the current battery assembly 770 with a different battery assembly 770.

Additional Configuration Considerations

The tunable optical element created with tunable polymer dispersed liquid crystal layers can be, generally, much smaller than their traditional optical element counterparts. The size of the optical elements allows for an increase in camera functionality as cameras and their associated optical suites miniaturize. For example, the tunable optical elements presented above can be on the order of several microns while their traditional optical counterparts can be on the order of millimeters.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs the disclosed embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera system including
an image sensor assembly configured to capture images, the image sensor assembly centered about an optical axis;
a tunable optical element for focusing light onto the image sensor assembly, the tunable optical element being substantially cylindrical having a bottom side and a top side centered about the optical axis comprising:
a first layer of a first material, the first layer having a first refractive index associated with the first material,
a second layer of a second material, wherein a polarization of the second material is controllable by an applied electric field, wherein the second layer has a second refractive index controllable by the polarization of the second material,
wherein the first and second layers are layered in a layer stack of the tunable optical element, and
wherein the second layer has an arc-shaped cross section forming a spherical cap, the spherical cap having its respective peak aligned with the optical axis;
wherein the first layer has a second cross section forming a reciprocal shape to the spherical cap; and
a first control element coupled to the tunable optical element for applying a voltage differential to the first and second layers, the voltage differential creating the electric field controlling the second refractive index of the second layer of the tunable optical element.

2. The camera system of claim 1 wherein the second material is a tunable polymer dispersed liquid crystal.

3. The camera system of claim 1 wherein the second material is controllable between a first state and a second state, the first state configuring the tunable element to transmit light and the second state configured to alter the transmitted light.

4. The camera system of claim 3, wherein the applied electric field toggles the second material from the first state to the second state.

5. The camera system of claim 3, wherein the polarization of the second material in the first state is a first value and the polarization of the second material in the second state is a second value.

6. The camera system of claim 1 wherein the first control element is a pair or electrodes coupled to opposing surfaces of the tunable optical element.

7. The camera system of claim 3, wherein a first voltage is applied to a first electrode of the pair and a second voltage is applied to a second electrode of the pair.

8. The camera system of claim 1 wherein applying the electric field changes the focal length of the tunable optical element.

9. The camera system of claim 1 wherein applying an electric field to the tunable element affects the optical aberration of the camera system.

10. The camera system of claim 1 comprising a lens tube comprising optical elements, the tunable element one of the optical elements of the lens tube.

11. A tunable optical element comprising
a tunable optical element that is substantially cylindrical having a bottom side, and a top side centered about the optical axis comprising:
a first layer of a first material, the first layer having a first refractive index associated with the first material;
a second layer of a second material, wherein a polarization of the second material is controllable by an applied electric field, wherein the second layer has a second refractive index controllable by the polarization of the second material;
wherein the tunable optical element centered about an optical axis an is substantially cylindrical and has a bottom side and a top side;
wherein the first and second layers are layered in a layer stack of the tunable optical element, and
wherein the second layer has an arc-shaped cross section forming a spherical cap, the spherical cap having its respective peak aligned with the optical axis;
wherein the first layer has a cross section forming a reciprocal shape to the spherical cap; and
a first control element coupled to the tunable optical element for applying a voltage differential to the first and second layers, the voltage differential creating the electric field controlling the second refractive index of the second layer of the tunable optical element.

12. The tunable optical element of claim 11 wherein the second material is controllable between a first state and a second state, the first state configuring the tunable element to transmit light and the second state configured to alter the transmitted light.

13. The tunable optical element of claim 11 wherein the second material is a tunable polymer dispersed liquid crystal.

14. The tunable optical element of claim 11 wherein the first control element is a pair or electrodes coupled to opposing surfaces of the tunable optical element.

15. The tunable optical element of claim 11 comprising a lens tube comprising optical elements, the tunable element one of the optical elements of the lens tube.

16. A camera system including
an image sensor assembly configured to capture images, the image sensor assembly centered about an optical axis;
a tunable optical element for focusing light onto the image sensor assembly, the tunable optical element being substantially cylindrical having a bottom side, and a top side centered about the optical axis comprising:
a first layer of a first material, the first layer having a first refractive index associated with the first material,
a second layer of a second material, wherein the second layer has a second refractive index controllable by an applied electric field,
wherein the first and second layers are layered in a layer stack of the tunable optical element, and
wherein the second layer has an arc-shaped cross section forming a spherical cap, the spherical cap having its respective peak aligned with the optical axis;
wherein the first layer has a second arc-shaped cross section forming a reciprocal shape to the spherical cap; and
a first control element coupled to the tunable optical element for applying a voltage differential to the first and second layers, the voltage differential creating the electric field controlling the second refractive index of the second layer of the tunable optical element.

17. The camera system of claim 16 wherein the second material is controllable between a first state and a second state, the first state configuring the tunable element to transmit light and the second state configured to alter the transmitted light.

18. The camera system of claim 16 wherein the second material is a tunable polymer dispersed liquid crystal.

19. The camera system of claim 16 wherein the first control element is a pair or electrodes coupled to opposing surfaces of the tunable optical element.

20. The camera system of claim 16 comprising a lens tube comprising optical elements, the tunable element one of the optical elements of the lens tube.

* * * * *